United States Patent
Johnson et al.

(10) Patent No.: US 7,103,610 B2
(45) Date of Patent: Sep. 5, 2006

(54) METHOD, SYSTEM AND COMPUTER PRODUCT FOR INTEGRATING CASE BASED REASONING DATA AND FAILURE MODES, EFFECTS AND CORRECTIVE ACTION DATA

(75) Inventors: Timothy Lee Johnson, Niskayuna, NY (US); Steven Hector Azzaro, Schenectady, NY (US); Daniel Joseph Cleary, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 645 days.

(21) Appl. No.: 10/302,440

(22) Filed: Nov. 25, 2002

(65) Prior Publication Data

US 2004/0103121 A1 May 27, 2004

(51) Int. Cl.
*G06F 7/00* (2006.01)
*G06F 17/30* (2006.01)

(52) U.S. Cl. .............................. 707/102; 707/1; 707/3; 707/100

(58) Field of Classification Search .................... 707/1, 707/3, 100, 101, 102
See application file for complete search history.

(56) References Cited

U.S. PATENT DOCUMENTS

| | | | | |
|---|---|---|---|---|
| 5,586,252 A | | 12/1996 | Barnard et al. | |
| 6,065,133 A | * | 5/2000 | Draber | 714/1 |
| 6,249,755 B1 | * | 6/2001 | Yemini et al. | 702/183 |
| 6,253,115 B1 | | 6/2001 | Martin et al. | |
| 6,643,801 B1 | * | 11/2003 | Jammu et al. | 714/37 |
| 6,909,994 B1 | * | 6/2005 | Johnson et al. | 702/185 |
| 2002/0023251 A1 | * | 2/2002 | Nasr et al. | 716/4 |
| 2002/0052862 A1 | | 5/2002 | Scott et al. | |
| 2002/0059093 A1 | | 5/2002 | Barton et al. | |

* cited by examiner

Primary Examiner—Sam Rimell
Assistant Examiner—Jacob F. Betit
(74) Attorney, Agent, or Firm—Fletcher Yoder

(57) ABSTRACT

A method of integrating case based reasoning data and FMECA data for product life cycle support. The method comprises creating an access path to case based data using a FMECA classification. The creating includes receiving a case based record including heading data. The heading data includes data elements and the data elements are correlated with data fields in a FMECA database. The FMECA database is searched for an entry that includes one or more of the data elements. The creating further includes determining if the entry should include a reference to the case based record. A new pointer to the case based record is inserted if the determining results in finding that the entry should include a reference to the case based record. The method for integrating case based reasoning data and FMECA data further comprises receiving a request from a user to access the case based data. The case based data is accessed via the FMECA database using the access path in response to the request.

21 Claims, 4 Drawing Sheets

FIG. 2

| FMECA DB DATA FIELDS | CASE BASED DB DATA ELEMENTS |
|---|---|
| 206 — SYSTEM | * PRODUCT LINE — 232 |
| 208 — SUBSYSTEM | PRODUCT — 234 |
| 210 — COMPONENT | PRODUCT COMPONENT OR REPLACEABLE UNIT — 236 |
| 212 — FAULT MODE | * CUSTOMER COMPLAINT — 238 |
| 214 — CAUSE | ROOT CAUSE (OR PROBLEM) — 240 |
| 216 — PRIMARY EFFECT | REPLACEABLE UNIT SYMPTOM — 242 |
| 218 — SYSTEM LEVEL EFFECT | * SYSTEM LEVEL SYMPTOM — 244 |
| 220 — SEVERITY | DAMAGE ASSESSMENT — 246 |
| 222 — OCCURRENCE | RATE OF OCCURRENCE OR LIKELIHOOD — 248 |
| 224 — DETECTABILITY | S/N OF BEST MEASUREMENT — 250 |
| 226 — MAINTENANCE AVAILABILITY | 252 |
| 228 — MEASUREMENT | * TROUBLE SHOOTING PROCEDURE |
| 230 — CORRECTIVE ACTION | * REPAIR PROCEDURE (OR SOLUTION) |

FMECA RECORD ~402

| SYSTEM | COMPONENT | FAULT MODE | CAUSE | PRIMARY EFFECT | CORRECTIVE ACTION |
|---|---|---|---|---|---|
| TURBINE | BATTERY LINE | BATTERY WEAK | OVER VOLTAGE | OVER-CHARGING | N/A |

ASSOCIATED CASE RECORD(S) ~404

| SYSTEM | COMPONENT | FAULT MODE | CAUSE | PRIMARY EFFECT | CORRECTIVE ACTION |
|---|---|---|---|---|---|
| TURBINE | BATTERY LINE | BATTERY WEAK | | OVER-CHARGING | |
| TURBINE | BATTERY LINE | BATTERY WEAK | | | |

400

METHOD, SYSTEM AND COMPUTER PRODUCT FOR INTEGRATING CASE BASED REASONING DATA AND FAILURE MODES, EFFECTS AND CORRECTIVE ACTION DATA

BACKGROUND OF THE INVENTION

The present disclosure relates generally to a method of integrating case based reasoning data and failure modes, effects and criticality analysis (FMECA) data. In particular, the present disclosure relates to a method of correlating data contained in a case based database and data contained in a FMECA database in order to allow case based reasoning data to be accessed via the FMECA database.

Failure modes and effects analysis (FMEA) is a methodology for determining the root causes and suggested corrective actions for defects in manufacturing processes and products. FMEA can be applied during the design phase of a product or process to identify potential fault modes or defects that may cause product or process failures. The FMEA methodology emphasizes defect prevention by examining all potential causes of a defect; the likelihood of these causes occurring and resulting in the defect; and ways of preventing these causes from occurring and resulting in the defect. The causes of defects in products may be defects in components that may be caused by sub-component defects. A typical FMEA includes a hierarchical list by component type of what happens to the overall product and the component when each part of the product fails. The hierarchy can include levels such as major division, system, sub-system, assembly, sub-assembly and part. The risk of potential fault modes are prioritized based on an estimated frequency of detection and severity. The probability of certain defects may be estimated by applying statistics to product or process histories. Otherwise, probabilities may be estimated based on experience.

Typically, in product or process design, an individual or a team is assigned to create a FMEA report or document. Team members can include representatives from disciplines such as engineering, purchasing, finance and field service. Performing FMEA can require that several experts assemble in one location for significant periods of time to generate the FMEA data. In a series of meetings, team members apply their expert knowledge and experience to develop a list of potential defects, their effects (e.g., severity), and potential causes of the defects. In addition, the defects are prioritized according to an estimated risk. The work is often divided up among the team members to be performed outside the meeting. The work performed outside the meeting is then discussed and validated in the meetings. The team comes to consensus on whether each potential defect and the effects and causes of the defect are correct, and how much risk there is for each. After the meetings have concluded, the resulting consensus information is gathered into a FMEA report or document. A typical FMEA report can contain hundreds of entries.

The FMEA team can also document suggested corrective actions to prevent the defects or faults from occurring during customer use of the product or process. This data can be added to the FMEA report. This augmentation of the FMEA report with corrective action data for fault modes is referred to as a failure modes, effects and criticality analysis (FMECA) report. Once the product or process is released for customer use, a case based system is typically utilized to track and resolve actual product or process failures in the field.

In contrast to FMECA, that includes a list of possible failures, a case based system tracks actual field failures. Problem-solution case bases are collected by service call centers and field service reporting methods. The case based data can be a collection of files or database objects that include large volumes of text descriptions. Cases can be classified based on variables such as date, customer, type of equipment, problem and solution. The data included in a FMECA report or database (e.g., potential failures) is often inconsistent in content and format with the data stored in a case based system (e.g., actual failures).

BRIEF DESCRIPTION OF THE INVENTION

One aspect of the invention is a method for integrating case based reasoning data and FMECA data for product life cycle support. The method comprises creating an access path to case based data using a FMECA classification. The creating includes receiving a case based record including heading data. The heading data includes data elements and the data elements are correlated with data fields in a FMECA database. The FMECA database is searched for an entry that includes one or more of the data elements. The creating further includes determining if the entry should include a reference to the case based record. A new pointer to the case based record is inserted if the determining results in a finding that the entry should include a reference to the case based record. The method for integrating case based reasoning data and FMECA data further comprises receiving a request from a user to access the case based data. The case based data is accessed via the FMECA database using the access path in response to the request.

Another aspect of the invention is a system for integrating case based reasoning data and FMECA data for product life cycle support. The system comprises a network, a first storage device including case based records, a second storage device including a FMECA database in communication with the network, a user system in communication with the network and a host system. The host system includes a case based system and is in communication with the network and the second storage device. The case based system includes software to implement a method comprising creating an access path to case based data stored on the first storage device using a FMECA classification. The creating includes receiving a case based record, across the network from the first storage device, including heading data. The heading data includes data elements and the data elements are correlated with data fields in a FMECA database stored on the second storage device. The FMECA database is searched for an entry that includes one or more of the data elements. The creating further includes determining if the entry should include a reference to the case based record. A new pointer to the case based record on the first storage device is inserted if the determining results in finding that the entry should include a reference to the case based record. The method for integrating case based reasoning data and FMECA data further comprises receiving a request from a user to access the case based data. The case based data is accessed via the FMECA database using the access path in response to the request.

A further aspect of the invention is a computer program product for integrating case based reasoning data and FMECA data for product life cycle support. The computer program product comprises a storage medium readable by a processing circuit and storing instructions for execution by the processing circuit for performing a method. The method comprises creating an access path to case based data using a FMECA classification. The creating includes receiving a case based record including heading data. The heading data includes data elements and the data elements are correlated with data fields in a FMECA database. The FMECA database is searched for an entry that includes one or more of the data elements. The creating further includes determining if the entry should include a reference to the case based record. A new pointer to the case based record is inserted if the determining results in finding that the entry should include a reference to the case based record. The method for integrating case based reasoning data and FMECA data further comprises receiving a request from a user to access the case based data. The case based data is accessed via the FMECA database using the access path in response to the request.

Further aspects of the invention are disclosed herein. The above discussed and other features and advantages of the invention will be appreciated and understood by those skilled in the art from the following detailed description and drawings.

BRIEF DESCRIPTION OF THE DRAWINGS

Referring to the exemplary drawings wherein like elements are numbered alike in the several FIGURES:

FIG. 2 is an exemplary embodiment of a database layout for integrating case based reasoning data and FMECA data;

FIG. 4 is an exemplary embodiment of a user interface for viewing integrated case based reasoning data and FMECA data.

DETAILED DESCRIPTION OF THE INVENTION

One embodiment of the invention is a method of relating the entries in a problem-solution case base, that is typical of equipment servicing, to FMECA data developed and utilized in the design of new products. The entries are related in such a way that the FMECA data can be updated automatically with the case based data, allowing service to be consistent, complete and current. By associating these two types of data, service personnel are able to provide more consistent service quality throughout the life cycle of a product, from initial product introduction through replacement or decommissioning, and to employ this information in the design of new product generations.

In an exemplary embodiment, a remote service advisor, when receiving a new call, uses the customer complaint to identify an appropriate segment of the FMECA report, or database. The FMECA segment that is identified is utilized to retrieve similar historical cases and service strategies. This information is retrieved through access to computer databases. When the case at hand is resolved, the new case record that has been created for the case at hand can be correlated to a FMECA segment for use in future service processes. Depending on the root cause and relevant outcome of the new case, its case record might or might not be retrieved in a subsequent search of the FMECA using the same search key. If the information provided by the first search was in fact relevant to a resolution of the new problem, then the new case may be classified similarly.

Figure 1:
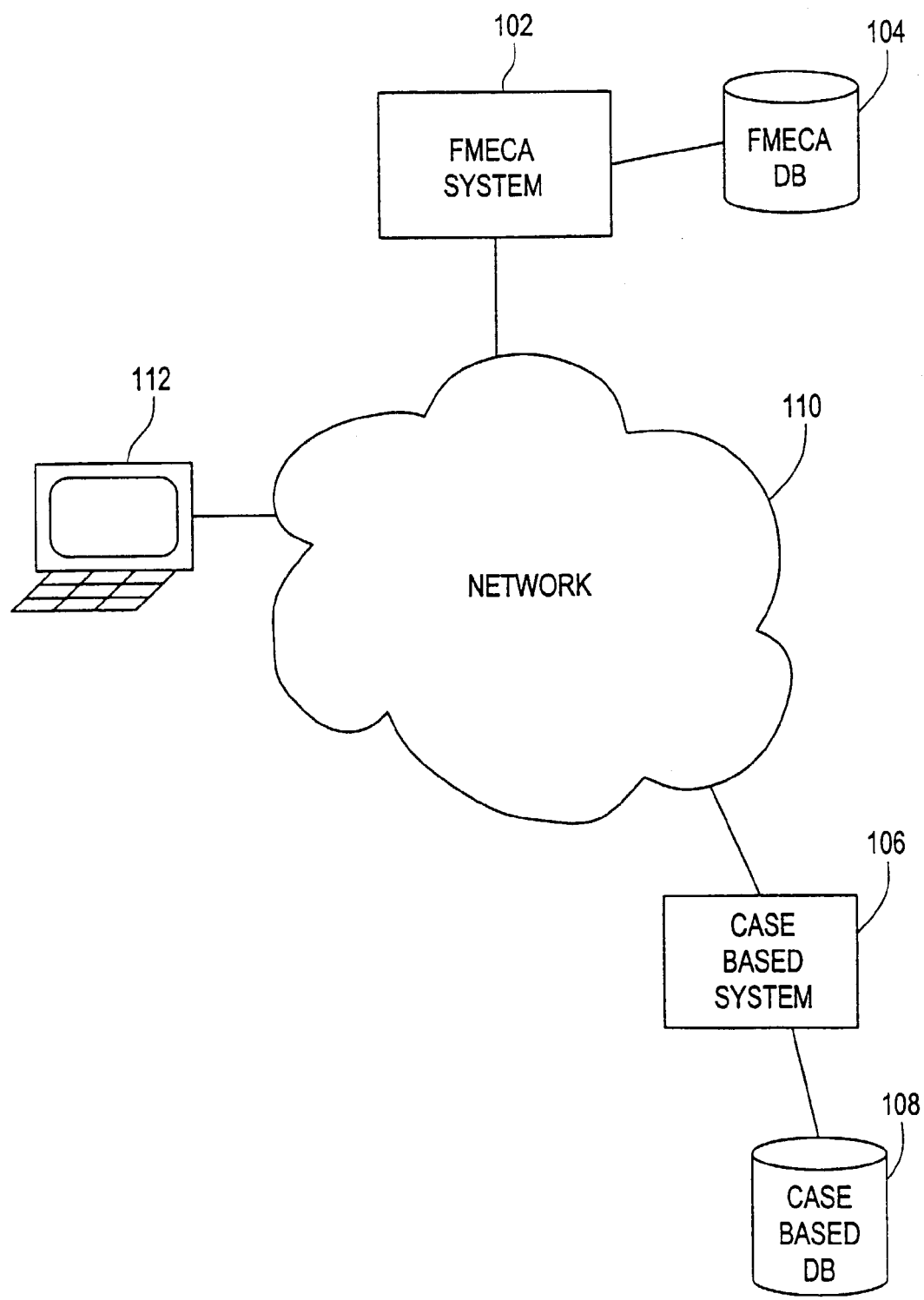
FIG. 1 is a block diagram of an exemplary system for integrating case based reasoning data and FMECA data.

FIG. 1 is a block diagram of an exemplary system for integrating case based reasoning data and FMECA data. The system of FIG. 1 includes a network 110 that is utilized to send data between the FMECA system 102 and the case based system 106. The network 110 may be any type of known network including a local area network (LAN), a wide area network (WAN), an intranet, or a global network (e.g., Internet). The case based system 106 may be coupled to the FMECA system 102 through multiple networks (e.g., intranet and Internet). In addition, the case based system 106 and the FMECA system 102 may be connected to the network 110 in a wireless fashion and the network 110 may be a wireless network. In an exemplary embodiment, the network 110 is the Internet and the case based system 106 executes an interface application to communicate directly with the FMECA system 102. Alternately, the case based system 106 could execute an interface application to communicate directly with the FMECA database 104 if the FMECA database is coupled to the network 110. In an alternate embodiment, the case based system 106 and the FMECA system 102 are located on the same host system and do not require a network 110 to communicate.

The system of FIG. 1 includes a case based system 106 and an associated case based database 108. The case based system 106 executes one or more programs to integrate data contained in the FMECA database 104 and data contained in the case based database 108. The case based system 106 accesses the FMECA database 104 through the FMECA system 102. The case based system 106 sends data to the FMECA system 102 and receives data from the FMECA system 102 over the network 110 in order to support the access to the case based database 108 via the FMECA system 102. Processing may be shared by the case based system 106 and the FMECA system 102. Alternatively, the FMECA system 102 can include a stand-alone software application for performing a portion of the processing described herein. It is understood that separate servers may be used to implement the network server functions and the application server functions or that they may be combined in a single host system executing computer programs to perform the requisite functions.

The storage devices containing the FMECA database 104 and the case based database 108 may be implemented using a variety of devices for storing electronic information such as a file transfer protocol (FTP) server or a remote data base access (ODBC) connection service. It is understood that the storage devices may be implemented using memory contained in the case based system 106 and the FMECA system 102 or they may be contained on separate physical devices. The case based system 106 and the FMECA system 102 may also operate as database servers and coordinate access to application data. The case based database 108 and the FMECA database 104 can be physically stored as a single database with access restricted based on user characteristics or they can be physically stored in a variety of databases including portions of the database on various storage devices. In an exemplary embodiment, the FMECA database 104 is implemented using a relational database system and the database system provides different views of the data to different applications, or users, based on application, or user, characteristics. In addition, the case records are stored in an Extensible Markup Language (XML) database and the case number, equipment type, or other tagged data such as a fault descriptor or category is the key into the case based database 108. Alternatively, a character count or offset number may be utilized to determine how far to index into a previously defined case file to get to a particular field such as equipment type or problem description.

An alternate embodiment of the present invention includes a user system 112 that is coupled to the network 110 for access to the case based data associated with particular FMECA data records. End-users can include product design team members (e.g., a product upgrade design team member) or product experts located in a design or manufacturing site, a field service engineer or product service provider located at a field office, an administrator and a product owner or customer. The user system 112 could be utilized for a variety of tasks including remote monitoring diagnostics, product upgrades, field service and customer self-service. The FMECA system 102 executes application programs that provide access to the FMECA database related to a particular product or process. The user system 112 can be directly connected to the FMECA system 102 or it can be coupled to the FMECA system 102 via the network 110. The user system 112 may be implemented using a general-purpose computer executing a computer program for carrying out the processes described herein. The user system 112 may be a personal computer or a host attached terminal. If the user system 112 is a personal computer, the processing described herein may be shared by the user system and the FMECA system 102 by providing an applet to the user system 112.

An embodiment of the present invention associates symptom/problem/solution data obtained during field service calls with fault mode/cause/effect/corrective action data contained in a typical FMECA report. FIG. 2 is an exemplary embodiment of a method of correlating FMECA database 104 data fields and case based database 108 data elements. The data fields listed under "FMECA database data fields" 202 are included in a FMECA database 104 and utilize design terminology. The corresponding case based database 108 data elements are listed under the heading "case based database data elements" 204 in FIG. 2 and utilize field service terminology. In an exemplary embodiment of the present invention, the database data elements listed under the "case based database data elements" 204 column include heading data elements in a case based database 108. One or more of these data elements may contain a data value in the case based database entry. The data elements that contain data values are compared to the FMECA database data fields in order to find the closest match. A heading data element associated with a case based database entry may contain a pointer to a location in a document. The location in the document contains data related to the particular data element. In an exemplary embodiment, the document is an XML document and data elements in the case based database entry may contain a pointer to a particular location in the XML document. Some case based entries contained in the case based database 108 may be cases that have been distilled and include heading data elements that correspond to the naming conventions and type of data fields located in the FMECA database 104. These case based records may have been distilled and correlated to the FMECA database 104 data fields by a product expert because they occur frequently or because they have a high risk prioritization number (RPN). The RPN is a number that can be derived by the system as the product of severity and occurrence. For purposes such as the design of monitoring and measurement systems, an extended RPN, including product detectability and data availability index values can also be used. Other case based database 108 records may contain data that has not been organized or analyzed in terms of FMECA data fields. These records may include blank heading data elements as well as heading data elements that contain pointers. An embodiment of the present invention can integrate both types of case based records into the FMECA database 104 records.

Referring to the database fields in FIG. 2, the data field labeled system 206 is the top-level physical product of interest (e.g., power distribution system, paper mill, steel rolling mill). System 206 correlates to product line 232 in the case based database 108. Subsystem 208 in the FMECA database 104 refers to the product that contains the problem and correlates to the product 234 in the case based database 204. The component 210 is a subset of the subsystem 208, such as another subassembly, assembly, or part depending on the level of the hierarchy of parts. Component 210 correlates to product component or replaceable unit 236 in the case based database 108. In an exemplary embodiment, fault mode 212 is an observable functional defect of the system. The fault mode 212 may include a fault code indicating if the product has built-in fault detection. In case based terminology, the fault mode 212 corresponds to the customer complaint 238. The exemplary FMEA database layout depicted in FIG. 2 also includes cause 214. Cause 214 is the root cause of the problem at the lowest level of detail that is of interest and it correlates to the root cause or problem 240 in the case based database 108. The primary effect 216 and system level effect 218 refer to the consequences of the cause 214. The primary effect 216 correlates to the replaceable unit symptom 242 in case based terminology and reflects the consequence of the cause 214 at the lowest level of interest (e.g., component). Similarly, the system level effect 218 is the consequence of the cause 214 at the highest level of interest (e.g., system) and correlates to the case based database system level symptom 244.

The exemplary embodiment of a FMECA database layout depicted in FIG. 2 also includes a field for severity 220. Severity 220 is a severity rating, according to a quantitative measure, of the fault, if it occurs. It can be utilized as an indication of the seriousness of the defect with respect to operation of the system and it correlates to damage assessment 246 in case based terminology. Occurrence 222 is the rate or likelihood of occurrence of the fault according to quantitative measures (e.g., an estimate of the number of occurrences of this failure per year, an estimate of the percentage of the units affected). Occurrence 222 correlates to rate of occurrence or likelihood 248 in case based terminology. Detectability 224 is the accuracy of the best available indicator of the fault or a physical measurement of the fault (e.g., probability of detection assuming a standard set of sensors). Detectability 224 does not have a direct correlation in the case based database 108 but the case based database can store the serial number of the best measurement 250 in this field. Maintenance availability 226 is a measurement of the ability to fix the fault once it is detected and has no correlation in the case based database 108. Measurement 228 identifies the best sensor to be used to measure the fault or the cause. Measurement 228 corresponds to trouble shooting procedure 252 in the case based database 108. The corrective action 230 includes a repair procedure for the fault and, as depicted in FIG. 2, it corresponds to the repair procedure (or solution) 254 in the case based database 108. Alternate embodiments of the case based database layout and the FMECA database layout are possible depending on the specific data requirements.

The case based database 108 data elements product line 232, customer complaint 238, system level symptom 244, trouble shooting procedure 252 and repair procedure (or solution) 254 are all preceded by a "*" in FIG. 2 to indicate data elements that are included in the heading of a case based record and that contain actual data values in an exemplary embodiment of the present invention. The remaining case based database 108 data elements shown in FIG. 2 may appear in extended notes and be accessed through a pointer into a document as discussed previously.

Figure 3:
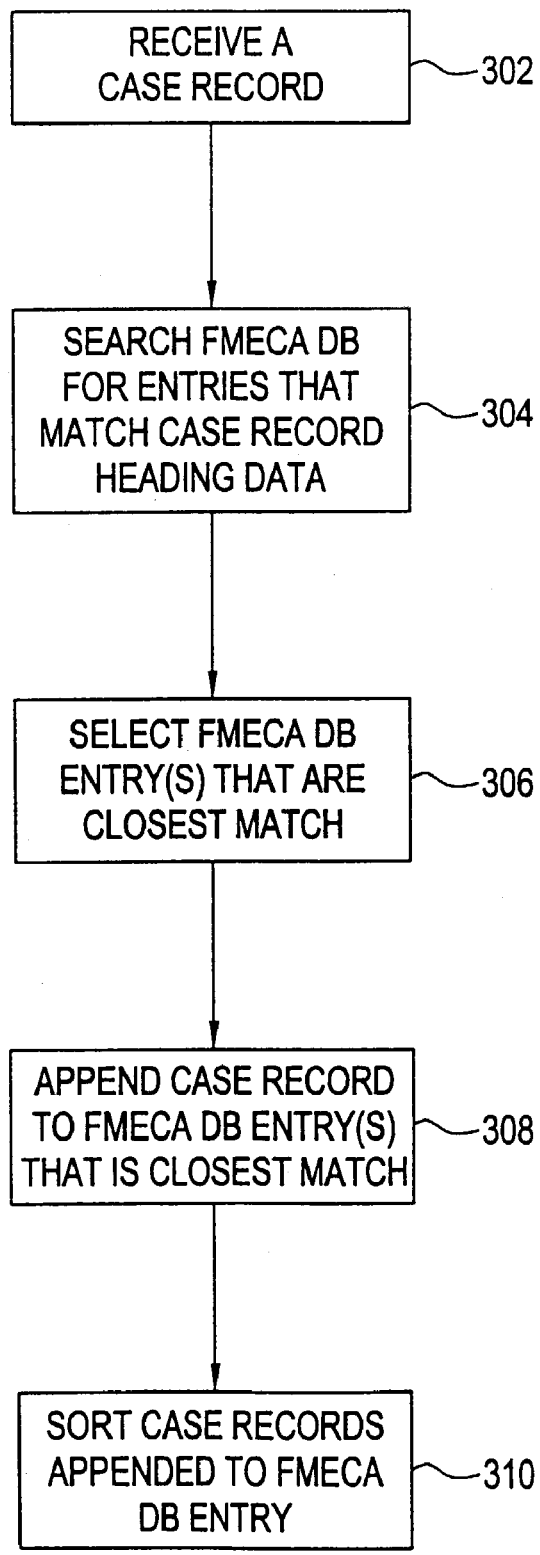
FIG. 3 is a block diagram of an exemplary embodiment of an overall process for integrating case based reasoning data and FMECA data.

FIG. 3 is a block diagram of an exemplary embodiment of an overall process for integrating case based reasoning data and FMECA data. In an exemplary embodiment, an access path to case based data using a FMECA classification is created and this access path is utilized when a request to access the case based data is received by the system. The case based database 108 is accessed through the FMECA database 104 by associating the case based records with related FMECA database records. The process of creating an access path to case based data using a FMECA classification as depicted in FIG. 3 can be performed automatically (e.g., in response to an update in the case based database 108, in response to an update in the FMECA database 104, on a periodic basis for all updated case based database 108 entries and to initialize the case based FMECA integration) in a background mode. In an alternate embodiment, this process could be performed, or computer determined correlations could be adjusted, by a product expert through an on-line screen. At step 302, a case record is received. In an exemplary embodiment, the case record includes heading data. The heading data may include data elements that contain a data entry, are blank or that contain a pointer. At step 304, a FMECA database 104 is searched for an entry that matches the case record heading. The database search tries to match as many of the data elements in the heading as possible with a FMECA entry in the FMECA database 104. In cases where the case record heading data element contains a pointer into a text document, the data located at the pointer location is substituted for the data entry value.

At step 306, one or more FMECA database 104 records that most closely match the case record heading are selected. For example, a case record may only contain a data entry for product line 232, product 234 and system level symptom 244. The rest of the case record heading data elements may contain pointers or be blank. In this example, the case record would be associated with each FMECA record relating to the specified product line 232, product 234 and system level symptom 244. In an alternate exemplary embodiment, the FMECA database fields are ordered in terms of a hierarchy of importance for matching. For example, system 206 may be at the highest level followed by subsystem 208 and component 210. When the search of the FMECA database 104 occurs, first all entries containing the same system 206 as the case record are located and then all entries with the same system 206 and subsystem 208. If there are no FMECA database 104 records with the same system 206 and subsystem 208 as the case record product line 232 and product 234, then the case record is appended to the system 206 entries. If there is a match between the system 206 and subsystem 208 and the case record product line 232 and product 234 then a search is made for FMECA database 104 records that contain the system 206, subsystem 208 and component 210. The search is continued in this manner until the lowest level of the hierarchy can be matched. This is considered to be the closest match.

At step 308, the case record in the case based database 108 is appended to the FMECA records that contain data fields that most closely match the case record heading data. The case record can be appended by inserting a pointer to the location of the case record in the case based database 108. At step 310, the case records appended to the FMECA database entry are sorted. They can be sorted based on how many case record heading data elements matched the FMECA database entry data fields. In this manner, the case records that matched the most fields in the FMECA database entry would be listed first. Alternatively, the case records can be sorted based on a hierarchy of importance of data fields (e.g., matching in particular fields is given priority in terms of order over matching in other fields). The case records could also be sorted based on a record prioritization number associated with the case record or based on highest quality cases. A variety of data structures, including linked lists, could be utilized to track and sort the associated case records for each FMECA database entry.

FIG. 4 is an exemplary embodiment of a user interface for viewing integrated case based reasoning data and FMECA data using a user system 112. As shown in FIG. 4, the FMECA database entry 402 is displayed on the user interface screen 400. Displayed below the FMECA database entry is one or more associated case records 404. This allows a FMECA user, such as a remote service advisor, to view FMECA data along with associated cases. A variety of user interface screens can be utilized with an embodiment of the present invention. The case records 404 displayed in FIG. 4 are sorted based on the number of data elements in the case heading that matched data fields in the FMECA database entry.

An embodiment of the present invention can be utilized for remote monitoring and diagnostics design. A subset of the FMECA and case based records could also be accessed through an on-line service center that can be accessed directly by customers or through field support personnel. In addition to its use in defining and fixing product defects, an embodiment of the present invention could be adopted to defining and fixing process defects.

An embodiment of the invention provides for integrating FMECA data and case based data, and for using the structure of the FMECA to classify cases. This can allow all product related fault information to be utilized during product service delivery. The entries are related in such a way that the FMECA data can be updated automatically with the case based data, allowing service to be consistent, complete and current. It can also allow for more consistent service because each service action is based on the best information available to date from all sources (e.g., the service knowledge is captured). Having this data centrally located can allow more rapid and accurate access to highly detailed technical information on product repair and result in speeding service delivery. In addition, the ability to start with a given effect and select all possible causes associated with it, both during design and use of the product can generate a set of possible causes that can be associated with the observed effect. This set can be utilized by the service person to identify items that he may subsequently need to discriminate among. This can save time for the service engineer by bringing to attention those alternate causes that may explain the main effect.

When a new product is introduced into the field, service data, based on FMECA data, can be utilized to provide a base for field service of the new product. Actual problems encountered in the field can be considered when upgrading to a new product release because the case data is correlated to the FMECA data. This can result in a higher quality product upgrade because it allows field experience to be accounted for in future product upgrades. In addition, new problems can be referred to the appropriate product designers through use of the FMECA structure. New service cases, even when they have incomplete information or missing field data in the association of the FMECA line, can be ranked based on similarity to existing rows of the FMECA (e.g., number of fields which agree) and listed for review in rank order of similarity. This can simplify the process of case review. In addition, similar cases can be clustered (based on an association matrix) into groups, and different solution methods associated with common causes can be compared for effectiveness.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of integrating case based data and FMECA data for product life cycle support, the method comprising:
    creating an access path to case based data using a FMECA classification, wherein said creating includes:
    receiving a case based record including heading data, wherein said heading data includes data elements;
    correlating said data elements in said heading data with data fields in a FMECA database;
    searching said FMECA database for an entry that includes one or more of said data elements;
    determining if said entry should include a reference to said case based record; and
    inserting a new pointer to said case based record in said entry if said determining results in finding that said entry should include a reference to said case based record;
    receiving a request from a user to access said case based data; and
    accessing said case based data via said FMECA database using said access path in response to said request.

2. The method of claim 1 wherein said access path is created for use in product service and said user is a product service provider.

3. The method of claim 1 wherein said access path is created for use in product upgrades and said user is a product upgrade design team member.

4. The method of claim 1 wherein said access path is created for use in self-service and said user is a product owner or customer.

5. The method of claim 1 wherein said determining includes:
    assigning a hierarchical order to said data fields in said FMECA database;
    evaluating said entry for a level of hierarchy match with said heading data; and
    finding that said entry should include a reference to said case based record in response to said evaluating resulting in a hierarchy match of the lowest level relative to other entries that include one or more of said data elements.

6. The method of claim 1 wherein said heading data includes a data pointer to a storage location.

7. The method of claim 6 wherein said data element value is determined by accessing data stored at said storage location.

8. The method of claim 1 wherein said receiving a case based record occurs on a periodic basis.

9. The method of claim 1 wherein said receiving a case based record occurs in response to an update in said case based record.

10. The method of claim 1 wherein said receiving occurs in response to an update in said FMECA database.

11. The method of claim 1 wherein said case based record is stored in a case based database.

12. The method of claim 11 wherein said database is a relational database.

13. The method of claim 1 wherein said case based record is in an XML format including pointers to said heading data.

14. The method of claim 1 further comprising:
    calculating an insertion position for said new pointer in response to said entry including an existing case based record pointer; and
    reordering said existing case based record pointer in response to said calculating.

15. The method of claim 1 wherein said data elements include product line, customer complaint, system level symptom, trouble shooting procedure and repair procedure.

16. The method of claim 1 where said data elements include product line, product and customer complaint.

17. A system of integrating case based data and FMECA data for product life cycle support, the system comprising:
    a network;
    a first storage device including case based records;
    a second storage device including a FMECA database in communication with said network;
    a user system in communication with said network; and
    a host system including a case based system in communication with said network and said first storage device, said case based system including software to implement a method comprising:
    creating an access path to case based data stored on said first storage device using a FMECA classification, wherein said creating includes:
    receiving a case based record across said network from said first storage device including heading data, wherein said heading data includes data elements;

correlating said data elements in said heading data with data fields in a FMECA database stored on said second storage device;

searching said FMECA database for an entry that includes one or more of said data elements;

determining if said entry should include a reference to said case based record; and inserting a new pointer to said case based record if said determining results in finding that said entry should include a reference to said case based record;

receiving a request from a user on said user system to access said case based data; and accessing said case based data via said FMECA database using said access path in response to said request.

18. The system of claim 17 wherein said first storage device and said second storage device are the same physical device.

19. The system of claim 17 wherein said network is the Internet.

20. The system of claim 17 wherein said network is an intranet.

21. A computer program product for integrating case based data and FMECA data for product life cycle support, the computer product comprising:

a storage medium readable by a processing circuit and storing instructions for execution by the processing circuit for performing a method comprising:

creating an access path to case based data using a FMECA classification, wherein said creating includes:

receiving a case based record including heading data, wherein said heading data includes data elements;

correlating said data elements in said heading data with data fields in a FMECA database;

searching said FMECA database for an entry that includes one or more of said data elements;

determining if said entry should include a reference to said case based record;

inserting a new pointer to said case based record in said entry if said determining results in finding that said entry should include a reference to said case based record; and receiving a request from a user to access said case based data; and accessing said case based data via said FMECA database using said access path in response to said request.

* * * * *